United States Patent [19]
Fitz

[11] Patent Number: 5,806,643
[45] Date of Patent: Sep. 15, 1998

[54] ONE WAY DRIVE DEVICE AND MECHANICAL ASSEMBLY INTEGRATING THE DEVICE

[75] Inventor: Frank Fitz, Poway, Calif.

[73] Assignee: Epilogics, L.P., Los Gatos, Calif.

[21] Appl. No.: 641,488

[22] Filed: May 1, 1996

[51] Int. Cl.$^6$ ............................ F16D 41/06; F16D 41/12
[52] U.S. Cl. ............................................. 192/45.1; 192/46
[58] Field of Search ............................ 192/46, 45.1, 45.2, 192/43.1, 41 A, 41 R

[56] References Cited

U.S. PATENT DOCUMENTS

| 547,386 | 10/1895 | Stewart. | |
|---|---|---|---|
| 2,240,359 | 4/1941 | Weigel. | |
| 2,779,201 | 1/1957 | Hurley. | |
| 2,947,395 | 8/1960 | Ullery | 192/45.2 |
| 5,070,978 | 12/1991 | Pires | 192/45.1 |
| 5,597,057 | 1/1997 | Ruth et al. | 192/46 |
| 5,632,364 | 5/1997 | Fitz | 192/46 X |

FOREIGN PATENT DOCUMENTS

| 1196231 | 11/1959 | France | 192/45.2 |
|---|---|---|---|
| 2152157 | 7/1985 | United Kingdom | 192/43.1 |
| WO 9116553 | 10/1991 | WIPO | 192/45.2 |

*Primary Examiner*—Charles A. Marmor
*Assistant Examiner*—Saúl J. Rodriguez
*Attorney, Agent, or Firm*—Brooks & Kushman P.C.

[57] ABSTRACT

A one-way drive device is disclosed herein including first and second members which are mounted for rotation about a given axis in a particular drive direction and which include respective first and second planar surfaces in close but spaced apart confronting relationship to one another. The overrunning clutch is also disclosed having a coupling arrangement including a strut for causing the first member to drive the second member in the particular drive direction when the first member is caused to rotate in that direction at a speed faster than the second member while allowing the first member to rotate in the particular drive direction at a slower speed than and independent of the second member. The one way drive device, as disclosed, includes a number of features. First, the first and second plate members are constructed of different materials, for example, aluminum and steel powder metal, respectively. In this way, the first member can also serve as an existing component of a separate mechanical assembly, for example a torque converter. Second, because of the feature just mentioned, the strut is specifically configured to compensate for the weaker aluminum, as contrasted with steel powder metal. Third, as a result of the first two features, the first plate member which is, for example, aluminum, includes a pocket for containing the strut, which pocket is deeper than corresponding pockets in the second plate member which is constructed of, for example, steel powder metal.

18 Claims, 1 Drawing Sheet

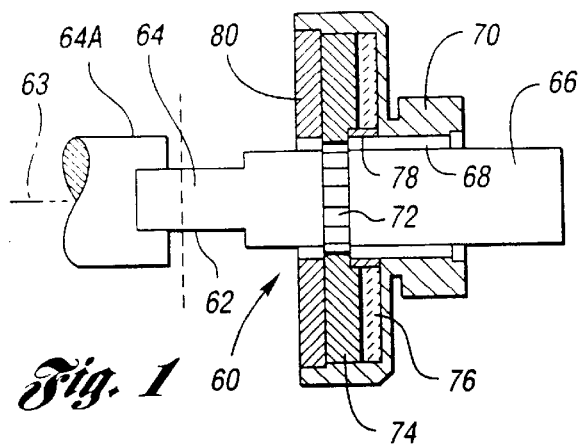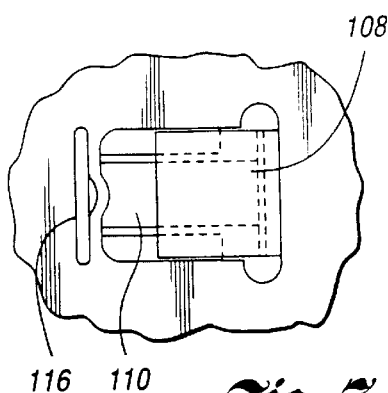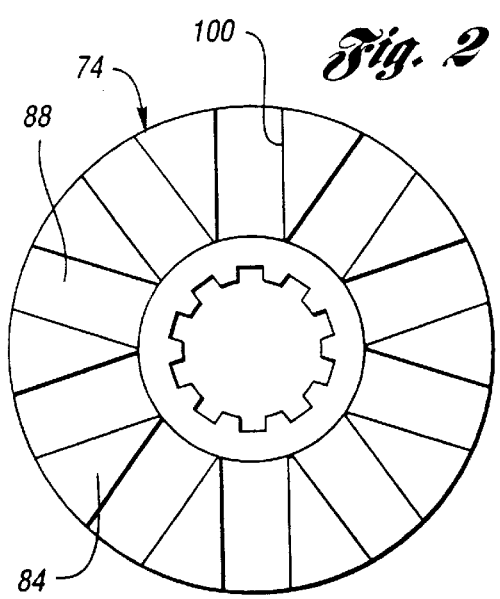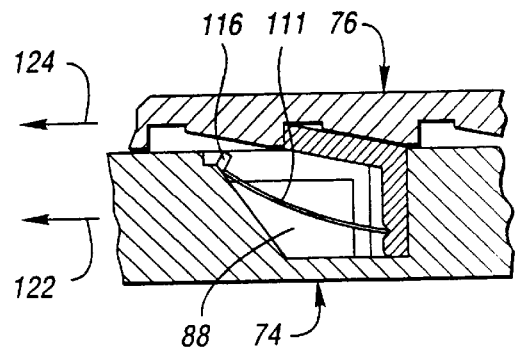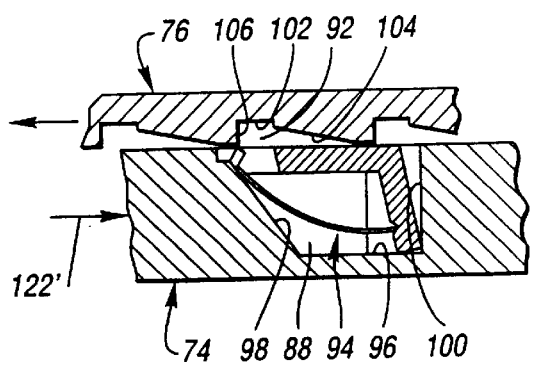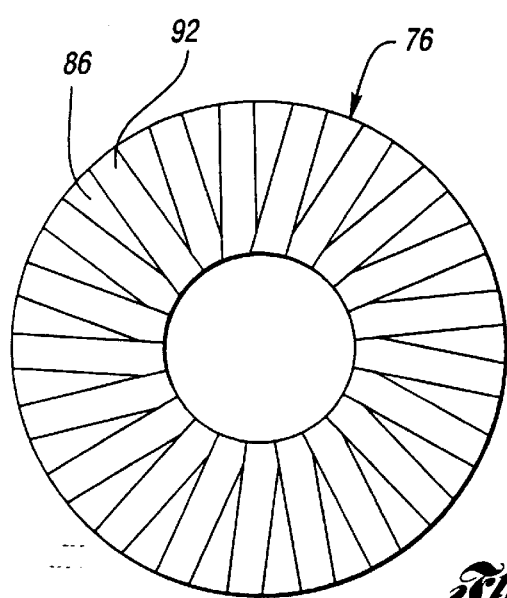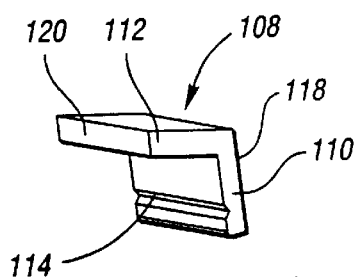

ONE WAY DRIVE DEVICE AND MECHANICAL ASSEMBLY INTEGRATING THE DEVICE

BACKGROUND OF THE INVENTION

The present invention relates generally to a one-way drive device such as an overrunning clutch and more particularly to a specifically designed side-by-side (planar) configured device corresponding in many ways to the one-way drive device disclosed and claimed in U.S. Pat. No. 5,070,978 issued to Paul B. Pires and assigned to the assignee of the present application (hereinafter referred to as the Pires patent).

The Pires patent, which is incorporated herein by reference, discloses a one-way drive device including first and second plate members which are mounted for both clockwise and counterclockwise rotation about a given axis and which include respective first and second planar surfaces in spaced apart but close confronting relationship to one another. For purposes of discussion, it will be assumed that the first plate member is the drive member and, hence, as described in the Pires patent, this first or drive member is connected to a suitable rotational input. It will also be assumed that the second plate member is the driven member and therefore is connected to a suitable load. Obviously, both in the case of the Pires patent and in the case of the present invention, the roles of these two plate members can be reversed, that is, the second member or what has been referred to as the driven member can be used to drive the first member or what has been referred to as the drive member.

Still referring to the Pires one-way drive device, its first or drive plate member includes a series of pockets which extend into the first planar surface and which are equally circumfrentially spaced about the given axis of rotation. The second or driven plate member includes similar pockets in its planar face, however differing in number for the reasons described in the Pires patent. A strut or pawl forming part of an overall strut or pawl assembly is mounted within each pocket of the first or drive member for movement between (1) a drive position during which the drive plate member drives the driven plate member (and its load) and (2) an overrunning position during which the drive plate member moves slower than the driven member in the driving direction or actually stops rotating or rotates in the opposite direction. As described in the Pires patent, the strut or pawl is generally rectangular and is specifically wider than it is thick and longer than it is wide and each of its opposing edges is a generally rectangular, parallel flat surface defined by the thickness and the width of the strut.

The Pires one-way drive device operates in the following manner (as does the device of the present invention). When the drive plate member attempts to rotate in the drive direction, for example, the counterclockwise direction, at a speed faster than the speed of rotation of the driven plate member in the same direction, one and only one of the struts or pawls is allowed to move into its drive position and it does so by moving partially into a cooperating aligned pocket in the driven member so that the opposing edges of the strut recited immediately above engage cooperating shoulders defined by the cooperating, aligned pockets. It is this interaction which causes the drive plate member to drive the driven plate member while at the same time it generates relatively high compressive forces across the interlocking strut between the cooperating shoulders. If the driven member rotates faster in the drive direction, for example the counterclockwise direction, or if the drive member rotates in the opposite direction, for example clockwise, relative to or faster than the driven member, the pockets of the driven member are configured to force the struts or pawls into their overrunning positions.

In the Pires device, because of the particular configuration of the struts or pawls and because of the particular way in which they function, as described briefly above, and because of cost considerations, the pockets of the drive plate member, that is the pockets containing the struts or pawls, and the pockets of the driven plate member are approximately equal in maximum depth. At the same time, the opposing engaging edges of each strut or pawl are similar if not substantially identical in configuration. This works well so long as the materials making up the drive and driven plate members are sufficiently strong so as to be able to handle the compressive forces acting upon the drive and driven member during the drive state. For example, in the case of an actual, commercialized one-way drive device designed in accordance with the Pires patent, both its drive plate member and its driven plate member are constructed of steel powder metal and their respective pockets and the struts themselves are designed to withstand the forces generated during the drive condition. However, applicant has discovered that by redesigning the struts or pawls and at least the drive or driven pockets, he can manufacture one of the plate members, for example the drive plate member, of a weaker but less expensive material than the other plate member, for example, of aluminum or plastic, without compromising the device's structural integrity, as will be seen hereinafter. In this way, a less expensive one-way drive device can be provided and/or the planar surface of an existing component of an existing separate and distinct mechanical assembly requiring a one-way drive device can be used as one of the drive device's plate members, even if the component is made of, for example, aluminum rather than steel or steel powder metal. One example of a separate and distinct mechanical assembly is a torque converter which includes a stator constructed of aluminum or plastic and which requires the use of a one-way drive device. In this case, as will be seen, the one-way drive device designed in accordance with the present invention utilizes the torque converter's aluminum stator as it's drive plate member without compromising it's structural integrity.

SUMMARY OF THE INVENTION

As will be described in more detail hereinafter, a one-way drive device designed in accordance with the present invention is disclosed herein. This device comprises (1) a first member which is mounted for rotation in a particular drive direction, for example the counterclockwise direction, and which includes a first planar surface, (2) a second member which is also mounted for rotation in the same drive direction and which includes a second planar surface, and (3) a coupling arrangement. The coupling arrangement includes a strut for causing the first member to drive the second member in the drive direction, for example the counterclockwise direction, when the first member attempts to rotate in that direction at a speed faster than the second member while at the same time allowing the first member to rotate in the drive direction at a slower speed than and independent of the second member.

In accordance with one feature of the present invention, one of the first and second members is constructed of a material which is different, typically weaker, than the material making up the other member. For example one member might be made of steel powder metal while the other is made from aluminum or plastic, thereby reducing the cost of the overall device as compared to a device which includes two steel powder metal members. In accordance with a second feature of the present invention, the first and second members respectively include drive and driven pockets in their confronting planar surfaces, one pocket of which extends deeper into its associated drive member than the other. In this way, in the case of the first-mentioned feature, the differences in the strength of the different materials making up the two members can be compensated for, as will be described in detail hereinafter. In accordance with a third feature of the present invention, which third feature follows from the first two features, the strut or pawl itself is configured to cooperate with the pockets of different depths. In a preferred embodiment, the strut or pawl is L shaped.

In accordance with a fourth feature of the present invention, because of the other features recited immediately above, the one-way drive device disclosed herein can be economically integrated into a mechanical assembly which includes a specific rotating component having a planar surface and which requires the use of a one-way drive device. Specifically by utilizing the planar surface of the specific rotating component of the mechanical assembly as one of it's first or second surfaces, the one-way drive device can be economically integrated into the assembly. One such mechanical assembly is a torque converter which includes as its specific rotating component an aluminum stator having a planar surface.

BRIEF DESCRIPTION OF DRAWINGS

The one-way drive device will be described in more detail hereinafter in conjunction with the drawings wherein:

FIG. 1 diagramatically illustrates in partially broken away cross section a one-way drive device which is designed in accordance with the present invention and which may be the device per se or some of its components may represent part of a mechanical assembly such as a torque converter;

FIG. 2 is an enlarged plan view of a first or drive plate member forming part of the device or assembly of FIG. 1 and including a planar surface and a series of strut receiving pockets extending into the planar surface;

FIG. 3 is a plan view of a second or driven plate member forming part of the device or assembly of FIG. 1 and including a planar surface and a series of pockets therein;

FIG. 4 diagramatically illustrates the drive and driven plate members of FIGS. 2 and 3 and a cooperating strut which also forms part of the device or assembly of FIG. 1, the drive and driven plate members and the strut being shown in a drive state;

FIG. 5 is a view similar to FIG. 4 but illustrating the drive and driven members and the strut in a overrunning state;

FIG. 6 is a perspective view of the strut shown in FIGS. 4 and 5; and

FIG. 7 diagramatically illustrates in plan view the way in which the strut of FIGS. 4–6 sits within a cooperating pocket within the drive member illustrated in FIG. 2.

DETAILED DESCRIPTION

Turning now to the drawings, wherein like components are designated by like reference numerals throughout the various figures, attention is initially directed to FIG. 1 which illustrates a one-way drive device designed in accordance with the present invention and generally designated by the reference numeral 60'. In actuality, FIG. 1 corresponds to FIG. 5 in the Pires patent and is used here to describe many of the components of the device 60' that are in common with the corresponding device in the Pires patent (which in FIG. 5 of that patent is designated by the reference numeral 60). For purposes of simplicity, those components which are illustrated in FIG. 1 and which are in common with the corresponding components of device 60 in the Pires patent are also designated by like reference numerals. For a detailed description of all of the common components, reference is made to the Pires patent.

It suffices here to point out that device 60' includes a drive plate member 74 (referred to as a strut plate in the Pires patent) which is mounted to an input shaft by means of splines 72 for both clockwise and counterclockwise rotation with the input shaft. Device 60' also includes a driven plate member 76 (referred to as a receptor plate in the Pires patent) which is also mounted for both clockwise and counterclockwise rotation and which is connectable to an external load through output shell 70 for applying an output rotation to the external member (not shown). The drive and driven plate members are mounted for rotation about common axis 63 and are positioned in spaced apart but close confronting relationship to one another, as illustrated in FIG. 1.

Referring to FIGS. 2 and 3, the drive and driven plate members 74 and 76, respectively, are illustrated in plan view. These plate members are shown including planar surfaces 84 and 86 which confront one another. As illustrated in FIG. 2, confronting surface 84, which serves as a drive face, includes a series of uniformly circumferentially spaced pockets 88 extending radially along substantially the entire radial extent of surface 84. As will be seen hereinafter, each pocket 88 is designed in accordance with the present invention and contains a strut assembly which is also designed in accordance with the present invention. Surface 86 of driven member 76 also includes a series of uniformly circumferentially spaced pockets 92, greater in number than pockets 88, extending radially substantially the entire extent of surface 86. The number of pockets 88 and 92 are selected to insure that one and only one strut assembly moves into its drive position at any one time in a preferred embodiment, as described in the Pires patent.

As will also be seen, all of the pockets 88 containing their respective strut assemblies and all of the pockets 92 together comprise an overall coupling arrangement for causing drive member 74 to drive driven member 76 in a particular drive direction, for example the counterclockwise direction, when the drive member attempts to rotate in that particular direction at a speed faster than the driven member. At the same time, the coupling arrangement (1) allows drive member 74 to rotate in the drive direction, for example the counterclockwise direction, at a slower speed than and independent of driven member 76, (2) it allows the drive member not to rotate at all independent of the driven member rotation in the drive direction, and (3) it allows the drive member to rotate in the opposite direction, for example, clockwise, independent of the rotation of the driven member in the drive direction and independent of the rotation of the driven member as the latter rotates at a slower speed in the opposite direction. For purposes of convenience, it will be assumed that the drive member drives the driven member in the counterclockwise direction and over-runs in the clockwise direction relative to the movement of the driven member. In this regard, it is to be understood that the drive and driven members are able to reverse roles, in which case when the driven member drives the drive member, it does so in the opposite direction, that is, the clockwise direction by rotating faster than the drive member in that direction.

In accordance with one feature of the present invention, drive member 74 and driven member 76 are constructed of different types of material. In particular, in a specific embodiment of the present invention, the driven member 76 is constructed of steel powder metal and the drive member 74 is constructed of lesser expensive and structurally weaker plastic or aluminum. This use of different materials has several advantages, assuming it does not compromise the required structural integrity of the device 60' given its ultimate intended use. First, it makes for a more economical device given that the plastic or aluminum or other such material is less expensive than steel powder metal. Second, for those mechanical assemblies which include specific rotating components having planar surfaces and which require one-way drive devices, it may be possible to use the assembly's rotating component as one of the plate members of one-way drive device 60', even if the rotating component is made of aluminum or plastic or other such material that differs from steel powder metal or whatever else the rest of the one-way device is made of. One example of such a mechanical assembly is a torque converter which includes an aluminum or plastic stator and which requires a one-way drive device. In this case, the stator can be utilized as, for example, the drive plate member and would accordingly be designed to include pockets 84 in its planar surface in the manner illustrated generally in FIG. 2.

Turning now to FIGS. 4 and 5, attention is specifically directed to one of the drive pockets 88 in drive member 74, one of the driven pockets 92 in driven member 76 and a strut assembly 94, all of which are designed in accordance with additional features of the present invention. As seen in both FIGS. 4 and 5, drive plate member 74 is substantially thicker than driven member 76 and, accordingly, drive pocket 88 is substantially deeper than driven pocket 92. As best illustrated in FIG. 5, the drive pocket is defined by an innermost base 96, a front wall 98 and a rearward strut engaging wall or shoulder 100. In a similar manner, pocket 92 is defined by its own base 102, an outwardly projecting and rearwardly tapering cam 104 and a front wall or strut engaging shoulder 106. Given that the radial dimensions of pockets 88 and 92 are approximately the same (see FIGS. 2 and 3), it should be clear that because strut engaging shoulder 100 is substantially deeper than strut engaging shoulder 106, the surface area defined by shoulder 100 is substantially greater than the surface area defined by shoulder 106. The reason that this is important will become apparent hereinafter.

Turning to FIG. 6 in conjunction with FIGS. 4 and 5, attention is now directed to a discussion of strut assembly 94. In accordance with the present invention, the strut assembly is comprised of a generally L shaped strut 108 and a leaf spring 110. In actuality, for reasons to become apparent hereinafter, strut 108 is not exactly L shaped, that is, it does not define a right angle between its legs 110 and 112 but rather an obtuse angle somewhere slightly greater than 90° and equal to or less than about 135°. In a preferred embodiment, the obtuse angle is approximately 105°. The inner surface of leg 110 includes a cross groove 114 to accommodate one end of leaf spring 111 as will be seen. At the same time, as best seen in FIGS. 4 and 7, pocket 88 includes a bend or swaged area 116 to accommodate the other end of the leaf spring 111.

Still referring to FIGS. 4 and 5, attention is now directed to the way in which strut 108 is mounted within pocket 88 by means of leaf spring 111 and the way in which the strut assembly functions in both the drive state of device 60' and in its overrunning state. The strut assembly is shown in its drive state in FIG. 4. As seen there, leaf spring 111 biases the back side 118 of leg 110 of strut 108 against strut engaging back wall or shoulder 100 of pocket 88. At the same time, because of the obtuse angle between legs 110 and 112, leg 112 extends upward out of pocket 88 (approximately 15° in its preferred embodiment) and into an adjacent cooperating pocket 92 so that the free end 120 of leg 112 engages shoulder 106. In this regard, it should be noted that shoulder 106 extends in from its planar surface 84 normal thereto and therefore free end 120 is cut at an obtuse angle with leg 112 in order to flushly engage against shoulder 106.

Still referring to FIG. 4, strut 108 takes the position illustrated when drive member 74 attempts to rotate in the drive direction indicated by arrow 122, for example in the counterclockwise direction, at a speed which is faster than that of driven member 76 in the same direction. As a result, the strut interlocks the driven member to the drive member causing the driven member to move with the drive member, as indicated by arrow 124. It should be noted that, under these circumstances, compressive forces build up across the strut and particularly against strut engaging shoulders 100 and 106. In the case of device 60 described in the Pires patent, these strut or pawl engaging shoulders are approximately equal in size and if the device is manufactured economically using the same material for the drive and driven members, the shoulders and the strut itself would be optimally designed to accommodate those drive forces. In the case of the present invention, because strut engaging shoulder 100 is so much larger in area than strut engaging surface 106, the compressive forces against shoulder 100 are spread to a greater extent than at shoulder 106 and, hence, the material making up drive member 74 does not have to be nearly as strong as the material making up driven member 76. Thus, for example, the drive member can be made of aluminum or plastic while the driven member is made of steel powder metal.

There is of course no issue with regard to compressive forces when the one-way drive device is in its overrunning state, as illustrated in FIG. 5. In this case, the driven member is moving in the drive direction of arrow 124 at a speed greater than that of the drive member. This is symbolized by the reverse arrow 122'. In this case, each successive cam 104 associated with each successive pocket 92 forces the strut 108 into it's recessed position, as it passes a strut.

As indicated above, one of the advantages of the present invention is the ability to integrate a one-way drive device of the general type described in the Pires patent into a mechanical assembly which includes a specific rotating component having a planar surface and which requires a one-way drive device. One example is a torque converter. Turning to FIG. 1, the drive plate member 74 could be viewed as such a component, for example the stator of the torque converter. For purposes of discussion, it will be assumed that the stator is constructed of cast aluminum. At the same time, it will be assumed that the driven plate member of the one-way drive device is constructed of steel powder metal. Under these circumstances, as a practical matter, it is necessary to consider the maximum design stresses for both materials. For steel powder metal, a general rule is to design for a maximum compressive stress of 80,000 psi. For high quality cast aluminum, the general rule is to design for a maximum compressive stress of 20,000 psi. Therefore, under these circumstances, aluminum strut engaging shoulder 100 would require a bearing area which is four times the bearing area on the steel powder metal shoulder 106 in order to carry the same torque which an all steel powder metal device would be able to carry. This is accomplished in accordance with the present invention by making shoulder 100 four times as deep as shoulder 106.

It is to be understood that the present invention is not limited to (1) the specific materials recited above, that is, steel powder metal, plastic and/or aluminum or (2) the particular configuration of pockets 88 and 92 and/or (3) the particular configuration of struts 108. Regarding the struts in particular, while a generally L shaped strut has been described, it could take on other configurations, for example, it could be somewhat triangular in configuration so long as it has the necessary shoulder engaging surfaces, as described above.

What is claimed is:

1. A one-way drive device, comprising:
   a first member rotatable about an axis and including a first generally planar face normal to the axis, the first face including a first recess defining a first shoulder;
   a second member rotatable about the axis and including a second generally planar face which is positioned in close proximity to and in confronting relationship with the first planar surface, the second face including a second recess defining a second shoulder; and
   a coupling arrangement operatively extending between the first face and the second face, the coupling arrangement including a strut having a first end surface for engagement with the first shoulder and a second end surface opposite the first end surface for engagement with the second shoulder, wherein a first contact area is achieved upon engagement of the first end surface with the first shoulder and a second contact area is achieved upon engagement of the second end with the second shoulder, the first contact area being substantially larger than the second contact area.

2. The one-way drive device of claim 1, wherein the strut includes a first leg and a second leg connected to the first leg so as to define an obtuse included angle therebetween, the first end surface being defined by the first leg and the second end surface being defined by the second leg.

3. The one-way drive device of claim 2, wherein the first end surface is defined by a first side of the first leg and the second end surface is defined by a free end of the second leg.

4. The one-way drive device of claim 1, wherein the free end of the second leg defines a substantially smaller second end surface than the first end surface defined by the first side of the first leg.

5. The one-way drive device of claim 2, wherein the included angle is greater than 90° and equal to or less than about 135°.

6. The one-way drive device of claim 5, wherein the included angle is about 105°.

7. The one-way drive device of claim 1, wherein the first end surface is in substantially parallel relation with the second end surface.

8. The one-way drive device of claim 1, wherein the first end surface has a substantially larger surface area than the second end surface.

9. The one-way drive device of claim 8, wherein the first recess is substantially deeper than the second recess.

10. The one-way drive device of claim 3, wherein the first leg includes a second side opposite the first side, and further including a spring on the first member engaging the second side of the first leg, whereby the first side of the first leg is urged towards the first shoulder.

11. The one-way drive device of claim 2, wherein the first shoulder is integrally formed in the first member and the second shoulder is integrally formed in the second member, and wherein the first member is formed of a first material and the second member is formed of a second material, the first material being structurally weaker than the second material.

12. A one-way drive device, comprising:
    a first member rotatable about an axis and including a first generally planar face normal to the axis, the first face including a first recess defining a first shoulder;
    a second member rotatable about the axis and including a second generally planar face which is positioned in close proximity to and in confronting relationship with the first planar surface, the second face including a second recess defining a second shoulder; and
    a coupling arrangement operatively extending between the first face and the second face, the coupling arrangement including a strut having a first leg and a second leg disposed at an obtuse angle with respect to the first leg, wherein a first side of the first leg defines a first shoulder-engaging surface on a first end of the strut and a free end of the second leg defines a second shoulder-engaging surface on a second end of the strut opposite the first end, wherein a first contact area is achieved upon engagement of the first shoulder-engaging surface with the first shoulder and a second contact area is achieved upon engagement of the second end with the second shoulder, and wherein the first contact area is substantially larger than the second contact area.

13. The one-way drive device of claim 12, wherein the first shoulder-engaging surface is in substantially parallel relation with the second shoulder-engaging surface.

14. The one-way drive device of claim 12, wherein the angle is greater than 90° and equal to or less than about 135°.

15. The one-way drive device of claim 12, wherein the angle is about 105°.

16. The one-way drive device of claim 12, wherein the first shoulder-engaging surface is in substantially parallel relation with the second shoulder-engaging surface.

17. The one-way drive device of claim 12, wherein the first recess is substantially deeper than the second recess.

18. The one-way drive device of claim 12, wherein the first leg includes a second side opposite the first side, and further including a spring on the first member engaging the second side of the first leg, whereby the first side of the first leg is urged towards the first shoulder.

* * * * *